US008719476B2

(12) United States Patent
Tokuda (10) Patent No.: US 8,719,476 B2
(45) Date of Patent: May 6, 2014

(54) COMMUNICATION SYSTEM, MASTER DEVICE AND SLAVE DEVICE, AND COMMUNICATION METHOD, CONFIGURED TO HANDLE PLURAL CONCURRENT REQUESTS

(75) Inventor: Masashi Tokuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 13/231,128

(22) Filed: Sep. 13, 2011

(65) Prior Publication Data

US 2012/0072629 A1 Mar. 22, 2012

(30) Foreign Application Priority Data

Sep. 16, 2010 (JP) ................................ 2010-208209

(51) Int. Cl.
 *G06F 13/00* (2006.01)
(52) U.S. Cl.
 USPC ............................... 710/110; 710/22; 710/28
(58) Field of Classification Search
 USPC ............................................ 710/22, 28, 110
 See application file for complete search history.

(56) References Cited

U.S. PATENT DOCUMENTS

| 5,564,025 | A | * | 10/1996 | De Freese et al. | ............ | 710/110 |
| 6,047,336 | A | * | 4/2000 | Green et al. | .................... | 710/22 |
| 6,463,494 | B1 | * | 10/2002 | Morriss et al. | ................ | 710/305 |
| 7,089,338 | B1 | * | 8/2006 | Wooten et al. | ................ | 710/110 |
| 7,254,688 | B2 | * | 8/2007 | Uneme | ......................... | 711/167 |
| 2008/0215779 | A1 | * | 9/2008 | Deshpande et al. | .......... | 710/110 |
| 2009/0248932 | A1 | * | 10/2009 | Taylor et al. | .................. | 710/110 |
| 2010/0222955 | A1 | * | 9/2010 | Chevalier | ........................ | 701/29 |

FOREIGN PATENT DOCUMENTS

| JP | 03-143047 A | * | 6/1991 | ............. H04L 12/40 |
| JP | 5-292148 | | 11/1993 | |
| JP | 2005-202643 | | 7/2005 | |
| JP | 2006-304011 | | 11/2006 | |

OTHER PUBLICATIONS

English translation of JP-03-143047; Ozaki; Jun. 1991.*

* cited by examiner

*Primary Examiner* — Glenn A Auve
(74) *Attorney, Agent, or Firm* — Cooper & Dunham LLP (57) ABSTRACT

A communication system includes a master device and slave devices. Each slave device includes a request signal generation part configured to, when data to transmit is generated, generate a request signal indicating a transmission request to a master device; and a transmission part configured to transmit the request signal to the master device. The master device includes a request signal reception part configured to receive the request signals from the slave devices; a selection part acting configured to select one of the slave devices according to the request signals received by the reception part; a transmission part configured to transmit a signal indicating to allow data transmission to the slave device selected by the selection part; and a data reception part configured to receive data from the selected slave device.

6 Claims, 4 Drawing Sheets

COMMUNICATION SYSTEM, MASTER DEVICE AND SLAVE DEVICE, AND COMMUNICATION METHOD, CONFIGURED TO HANDLE PLURAL CONCURRENT REQUESTS

BACKGROUND OF THE INVENTION

1. Field of the Invention

The present invention relates to a communication system having a master device and slave devices.

2. Description of the Related Art

As an example where serial communication is carried out between one master device and plural slave devices, there is an example where a data line and a clock line are shared by all the slave devices (for example, see Japanese Laid-Open Patent Application No. 5-292148). Even when a communication bit length is different for each slave device, it is possible to carry out communication with the plural slave devices where a data line and a clock line are shared for the plural slave devices having different communication bit widths, by using a bit length setting register.

Further, there is a configuration where by having a clock generation circuit, it is possible to carry out communication at a communication rate suitable for each device to carry out communication with (for example, see Japanese Laid-Open Patent Application No. 2006-304011).

In a case where serial communication is carried out, a master device which carries out system control is to start an operation of the serial communication. Generally speaking, a SPI (Serial Peripheral Interface) or an IIC (Inter-Integrated Circuit) may be used for serial communication. For example, in a case where an apparatus such as a printer controls plural slave devices, a master device carries out communication with the slave devices periodically, for example, every several milliseconds through tens of milliseconds, to obtain information indicating states of the slaves.

In a system where communication is carried out from only a master device, generally speaking the master device is to carry out communication periodically with slave devices every predetermined time period to obtain information from the slave devices.

In a case where the number of slave devices connected with a master device is large, it may be a considerable load of the master device to read the states of the slave devices. For example, there may be a system where a sensor is connected to a slave device and information is sent to a master device from the slave device only when a state of the sensor changes. However, when the slave device is connected with the master device in a serial connection manner, the master device can know a change in the state of the slave device by only reading information from the slave device by the master device by itself. Therefore, when intervals at which the master device reads the information from the slave device are too long, the slave device cannot immediately send a change in the state of the sensor to the master device. When the intervals are too short, the communication amount is increased and the load of the CPU of the master device is increased accordingly.

SUMMARY OF THE INVENTION

According to an embodiment of the present invention, a communication system has a master device and slave devices, and each slave device includes a request signal generation part configured to generate a request signal indicating a transmission request to the master device in a case where data to transmit is generated; and a transmission part configured to transmit the request signal to the master device. The master device includes a request signal reception part configured to receive the request signals from the slave devices; a selection part configured to select one of the slave devices to be allowed to transmit data in response to the request signal received by the request signal reception part; a transmission part configured to transmit to the selected slave device selected by the selection part a signal indicating to allow data transmission; and a data reception part configured to receive data from the selected slave device.

According to another aspect of the embodiment of the present invention, a communication method in a communication system that has a master device and slave devices, and the communication method includes generating by the slave devices request signals indicating transmission requests to the master device in a case where data to transmit is generated; and transmitting by the slave devices the request signals to the master device. The communication method further includes receiving by the master device the request signals from the slave devices; selecting one of the slave devices to be allowed to transmit data in response to the received request signals; transmitting by the master device to the selected slave device a signal indicating to allow data transmission; and receiving by the master device data from the selected slave device.

Other objects, features and advantages of the present invention will become more apparent from the following detailed description when read in conjunction with the accompanying drawings.

DETAILED DESCRIPTION OF THE EMBODIMENT

An object of an embodiment of the present invention is to reduce a load of a master device.

Below, the embodiment of the present invention will be described with reference to figures.

It is noted that through all the figures, the same reference numerals are given to parts that have the same functions, and repetitive description will be omitted.

<Communication System>

Figure 1:
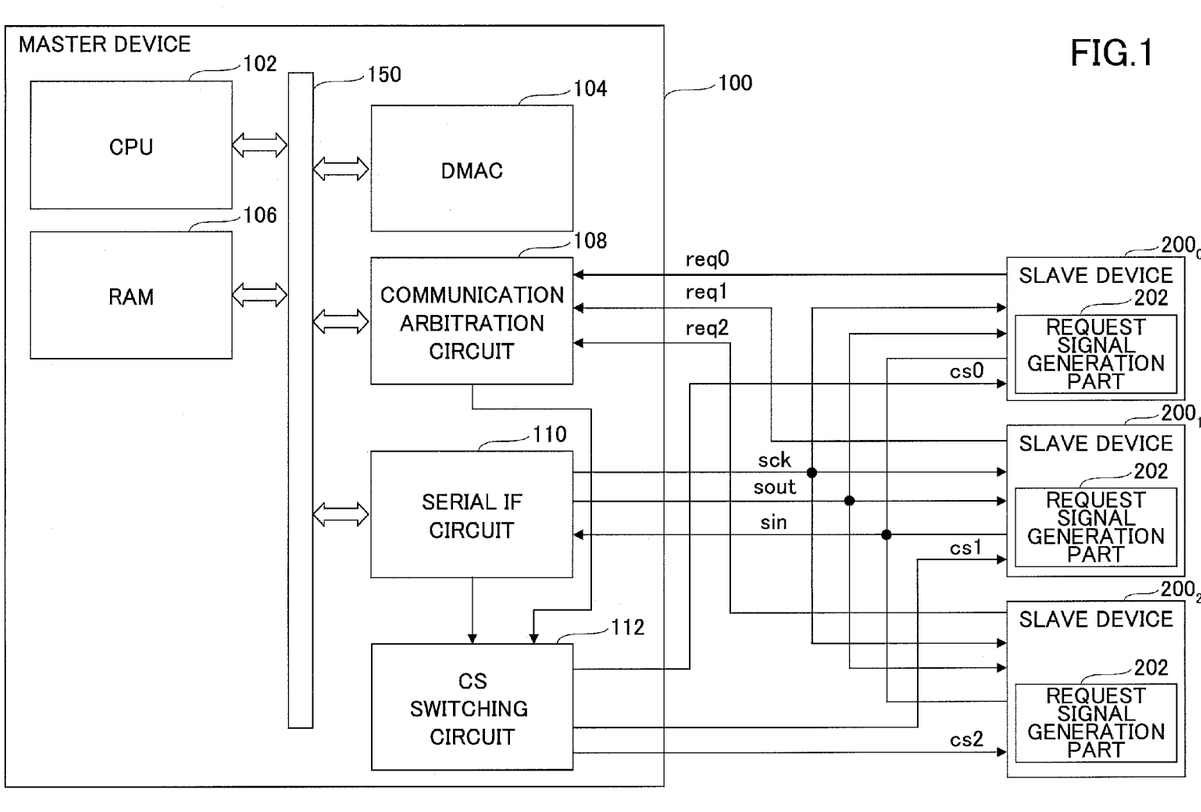
FIG. 1 is a block diagram showing one example of a communication system according to an embodiment of the present invention.

FIG. 1 shows a communication system according to the embodiment of the present invention.

According to the embodiment of the present invention, a SPI (Serial Peripheral Interface), for example, is used as a serial interface. However, the serial interface is not limited to SPI and any other serial interface than SPI may be used instead. For example, I2C may be used instead.

The communication system includes a master device 100 and slave devices $200_n$ (n denotes an integer equal to or more than 0, i.e., $0 \leq n$). The master device 100 is also called a host device. For example, the master device 100 includes a CPU (Central Processing Unit) and a DMA (Direct Memory Access) controller built-in, and carries out serial communication with the slave devices $200_n$. The master device 100 and the slave devices $200_n$ are connected in a serial connection manner.

The master device 100 that acts as a controller controlling the slave device $200_n$ may be mounted in a printer. For the master device 100, the slave devices $200_n$ may include various sensors, motors or such.

In the communication system shown in FIG. 1, the three slave devices $200_0$ through $200_2$ are connected to the one master device 100. Instead, only one slave device may be connected to the one master device 100, two slave devices may be connected the one master device 100 or four or more slave devices may be connected to the one master device 100.

In the communication system, in a case where the states of the sensors included in the slave devices $200_0$ through $200_2$ change or another case, the slave devices $200_0$ through $200_2$ issue (generate) request signals as transmission start signals, and transmit the request signals. Without limiting to the case where the states of the sensors included in the slave devices $200_0$ through $200_2$ change, the slave devices $200_0$ through $200_2$ may generate request signals as transmission requests when data to be sent to the master device 100 is generated. In response to receiving the request signal, the master device 100 starts communication with the corresponding slave device.

Thus, the slave devices $200_0$ through $200_2$ are configured to be able to, in a case where data to be transmitted to the master device 100 is generated, transmit the request signals for requesting to transmit the data. Further, the master device 100 is configured to be able to, in a case of receiving the request signal, start communication. Thereby, the master device can start communication when it is necessary. In contrast thereto, in the related art, the master device 100 polls the slave devices $200_0$ through $200_2$ every predetermined time period to read the states of the slave devices. Thus, in the related art, the master device can know the states of the slave devices only by reading from the side of the master device. However, according to the embodiment of the present invention, the master device 100 can carry out communication with the slave devices $200_0$ though $200_n$ when it is necessary. Therefore, the communication system can be established with the necessary and sufficient communication amount.

Specifically, the slave devices $200_0$ through $200_2$ have request signal generation parts 202 generating the request signals, respectively.

The slave devices $200_0$ through $200_2$ assert the request signals in the request signal generation parts 202 in a case of having information to be transmitted to the master device 100. As the slave devices $200_0$ through $200_n$ assert the request signals for the master device 100, it is possible to reduce the communication amount required when the master device 100 reads the states of the slave devices $200_0$ through $200_2$. Therefore, it is possible to reduce the load of the CPU 102 of the master device 100.

Further, the master device 100 uses, for serial communication, DMA technique between a serial IF circuit 110 and a RAM 106 without passing data through the CPU 102 for at least one of the data having been received from any one of the slave devices $200_0$ through $200_2$ and the data to be transmitted to any one of the slave devices $200_0$ through $200_2$. By thus using DMA technique between the serial IF circuit 110 and the RAM 106, it is possible to further reduce the load of the CPU 102.

<Master Device>

The master device 100 has the CPU (Central Processing Unit) 102. The CPU 102 controls the master device 100. Specifically, the CPU 102 controls the DMAC (Direct Memory Access Controller) 104, the RAM (Random Access Memory) 106, a communication arbitration circuit 108, the serial IF (InterFace) circuit 110, and a CS (chip select) switching circuit 112. The CPU 102 operates according to a program stored in a memory (not shown). For example, the CPU 102 controls preparation of transmission data, processing of received data, setting registers of the DMAC 104, setting registers of the communication arbitration circuit 108, and so forth.

The master device 100 has the DMAC 104. The DMAC 104 carries out a control operation for when the serial IF circuit 110 transfers data to the RAM 106 without passing it through the CPU 102. For example, when the master device 100 is to receive data from the slave devices $200_0$ through $200_2$, the CS switching circuit 112 transmits data for notifying the slave devices $200_0$ through $200_2$ of start of communication. The data for notifying of a start communication is called a chip select signal. The DMAC 104 started up by the CPU 102 transfers received data, having been transmitted from the corresponding slave device in response to the chip select signal, to the RAM 106 in response to a transfer request from the serial IF circuit 110 according to the DMA technique.

The master device 100 has the RAM 106. The RAM 106 stores certain information. For example, the RAM 106 temporarily stores data from the serial IF circuit 110. When data is transferred to the RAM 106 from the serial IF circuit 110, DMA technique may be used. A data transfer using DMA technique may be referred to as a DMA transfer.

The master device 100 has the communication arbitration circuit 108. The request signals (req0, req1, req2) from the slave devices $200_0$ through $200_2$ are input to the communication arbitration circuit 108. The communication arbitration circuit 108 receives the request signals (req0, req1, req2) from the slave devices $200_0$ through $200_2$, and carries out arbitration of communication between the master device 100 and the slave devices $200_0$ through $200_2$.

Communication lines by which the request signals are transmitted (hereinafter, referred to as "request communication lines) (req0, req1, req2) are provided for the respective ones of the slave devices $200_0$ through $200_2$. In other words, the request communication lines req0, req1 and req2 are provided to connect between the master device 100 and the respective ones of the slave devices $200_0$ through $200_2$ in a one-to-one manner.

The communication arbitration circuit 108 has the registers, settable by the CPU 102, for designating starting addresses in the RAM 106 for storing data received from the respective slave devices $200_0$ through $200_2$. The request signals from the slave devices $200_0$ through $200_2$ are input to the communication arbitration circuit 108. The communication arbitration circuit 108 recognizes logics of the request signals, and holds the request signals transmitted by of the respective slave devices $200_0$ through $200_2$.

For example, ordinarily, the request communication line has an "H" (High) level. In a case where the slave device has data to be read by the master device 100, the slave device changes its own request communication line from the "H" level to an "L" (Low) level. The communication arbitration circuit 108 of the master device 100 recognizes that the transmission request is generated in the slave device in response to the corresponding request communication line being thus changed from the "H" level to the "L" level. The communication arbitration circuit 108 holds the number of items of this sort of information corresponding to the number of the slave devices $200_0$ through $200_2$. For example, the communiarbitration circuit 108 stores the values of the request signals according to FIFO (First-In First-Out) technique.

There may be a case where the plural request signals are received from the slave devices $200_0$ through $200_2$ simultaneously, or a case where while transmission is being carried out in response to the request signal from one of the slave devices $200_0$ through $200_2$, plural transmission requests are input from plural of the others of the slave devices $200_0$ through $200_2$. In such a case, when transmission is to be started, the slave device to carry out communication may be determined by a predetermined certain priority order. For example, the slave device to carry out communication may be determined according to the order of the arrivals of the respective request signals on first-come-first-served basis.

When the slave device to carry out communication is thus determined, the communication arbitration circuit 108 inputs a selection signal to the CS switching circuit 112. The selection signal is a signal whereby the chip select signal is to be provided to only the slave device determined to carry out communication, and the request signals corresponding to the other slave devices are to be made to have deasserted states.

The master device 100 has the serial IF circuit 110. The serial IF circuit 110 outputs a clock signal (sck) and transmission data (sout) to the slave devices $200_0$ through $200_2$. The clock signal (sck) and the transmission data (sout) are provided via a common line since serial communication is carried out between the master device 100 and the slave devices $200_0$ through $200_2$.

Further, transmission data (sin) from the slave devices $200_0$ through $200_2$ is input to the serial IF circuit 110. The transmission data from the respective slave devices $200_0$ through $200_2$ is provided via a common line. The serial IF circuit 110 inputs a timing signal to the CS switching circuit 112. The timing signal is a signal indicating a timing at which the chip select signal is to be transmitted.

The master device 100 has the CS switching circuit 112. The CS switching circuit 112 transmits the chip select signal to the slave device determined to carry out communication according to the selection signal input by the communication arbitration circuit 108 and according to the timing signal input by the serial IF circuit 110. The CS switching circuit 112 causes the request signals corresponding to the slave devices other than the slave device determined to carry out communication to have the deasserted states. Chip select communication lines cs1, cs2 and cs3 connect between the master device 100 and the respective slave devices $200_0$ through $200_2$ in a one-to-one manner. By the selection signal indicating the slave device determined to carry out communication, the master device 100 can recognize the slave device determined to carry out communication.

The CPU 102, the DMAC 104, the RAM 106, the communication arbitration circuit 108, the serial IF circuit 110 and the CS switching circuit 112 are connected by a bus 150.

<DMA Transfer Process>

As for the CPU 102, the DMAC 104 and the serial IF circuit 110, common configurations may be used.

For example, an "ARM" (registered trademark of ARM limited) family CPU may be used as the CPU 102. As the DMAC 104, "ARM" (registered trademark of ARM limited) "PrimeCell" (registered trademark of ARM limited) PL080 (hereinafter, simply referred to as "PL080") may be used. As the serial IF circuit 110, a synchronous serial port "ARM" (registered trademark of ARM limited) "PrimeCell" (registered trademark of ARM limited) PL022 may be used. The embodiment of the present invention is described here assuming that the circuits using the above-mentioned products are used.

For example, in PL080 used as the DMAC 104, it is possible to use a link list item (LLI) register, carry out a DMA transfer for a certain number of words between data disposed at consecutive addresses of a memory area in the RAM 106 and a peripheral circuit (i.e., the serial IF circuit 110), and after the DMA transfer, carry out another DMA transfer between another memory area in the RAM 106 and the peripheral circuit (the serial IF circuit 110) in the same way.

The LLI information includes a transfer source address, a transfer destination address, a subsequent LLI address and control information. The control information may include a designated number of words to be transferred. The LLI information ("LLI for reception CH") is disposed (loaded) in a memory included in the DMAC 104. When finishing a transfer of certain words according to the loaded LLI information, PL080 then loads the subsequent LLI information from the communication arbitration circuit 108 according to the subsequent LLI address included in the current LLI information, and carries out a similar process according to the currently loaded subsequent LLI information. As a result of the process being thus repeated, data is transferred to the RAM 106, for example.

In PL080, thus, when a transfer of a series of data is completed according to the current LLI information, the subsequent LLI information is loaded from the communication arbitration circuit 108. In serial communication carried out by the master device 100, the RAM 106 that stores information to be transmitted to or information having been received from the slave device determined to carry out communication when the request signal has been received from the slave device is designated as the "transfer destination" or the "transfer source" of the LLI information.

Figure 2:
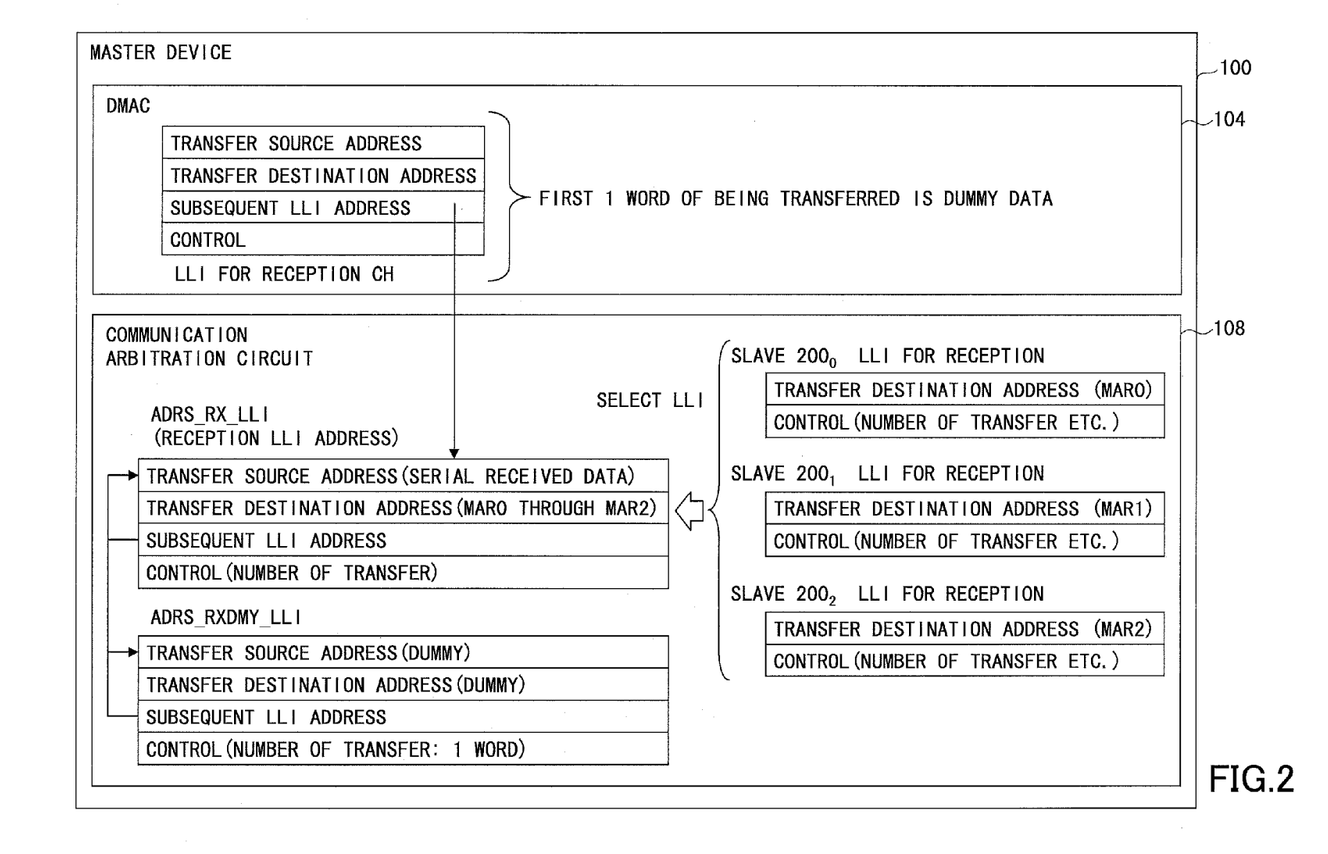
FIG. 2 is a block diagram showing one example of a master device according to the embodiment of the present invention.

FIG. 2 shows one example of a DMA transfer process in the master device 100.

As shown in FIG. 2, the LLI information is prepared by the communication arbitration circuit 108 and is loaded by the DMAC 104 according to "subsequent LLI address" included in the LLI information currently loaded in the DMAC 104. The DMAC 104 carries out a DMA transfer according to the currently loaded LLI information.

The communication arbitration circuit 108 prepares LLI information for reception, i.e., "slave $200_0$ LLI for reception", "slave $200_1$ LLI for reception" and "slave $200_2$ LLI for reception" for the serial received data that is received from the slave device $200_0$, the slave device $200_1$ and the slave device $200_2$, respectively.

It is noted that the master device 100 cannot predict the request signal which will be generated subsequently in the slave devices $200_0$ through $200_2$. This is because, for example, it is not possible to predict when information to be transmitted will be generated in the slave devices $200_0$ through $200_2$. Since it is thus not possible to predict a generation of the request signal in the slave devices $200_0$ through $200_2$, dummy LLI information "ADRS_RXDMY_LLI" is prepared. The dummy LLI information "ADRS_RXDMY_LLI" is loaded from the communication arbitration circuit 108 to the DMAC 104 once after a transfer request by the DMAC 104 is asserted. This is for the purpose of avoiding a transfer error.

For example, the LLI information "ADRS_RX_LLI" prepared by the communication arbitration circuit 108, based on one appropriately selected from the above-mentioned LLI information "slave $200_0$ LLI for reception", "slave $200_1$ LLI for reception" and "slave $200_2$ LLI for reception", includes the "transfer source address". For example, the transfer source address includes the transfer source address included in the corresponding "serial received data", i.e., the received data from the corresponding slave device.

The LLI information "ADRS_RX_LLI" further includes the "transfer destination address". For example, the transfer destination address includes the address in the RAM 106, "MAR0", "MAR1" or MAR2", for storing data from the slave device $200_0$, $200_1$ or $200_2$, respectively. Further, the LLI information includes the "subsequent LLI address". The LLI information "ADRS_RX_LLI" further includes the "control information". The control information includes, for example, the "number of transfer" (i.e., the number of words to be transferred).

For example, after the loading of the dummy LLI information "ADRS_RXDMY_LLI" from the communication arbitration circuit 108 to the DMAC 104, the LLI information "ADRS_RX_LLI" for transferring the serial received data is loaded by the DMAC 104 from the communication arbitration circuit 108 in response to the transfer request from the DMAC 104.

By repeating the process, it is possible to transfer and store the serial received data received from the slave devices $200_0$, $200_1$ and $200_2$ at the certain areas of the RAM 106.

<Operations of Communication System (No. 1)>

Figure 3:
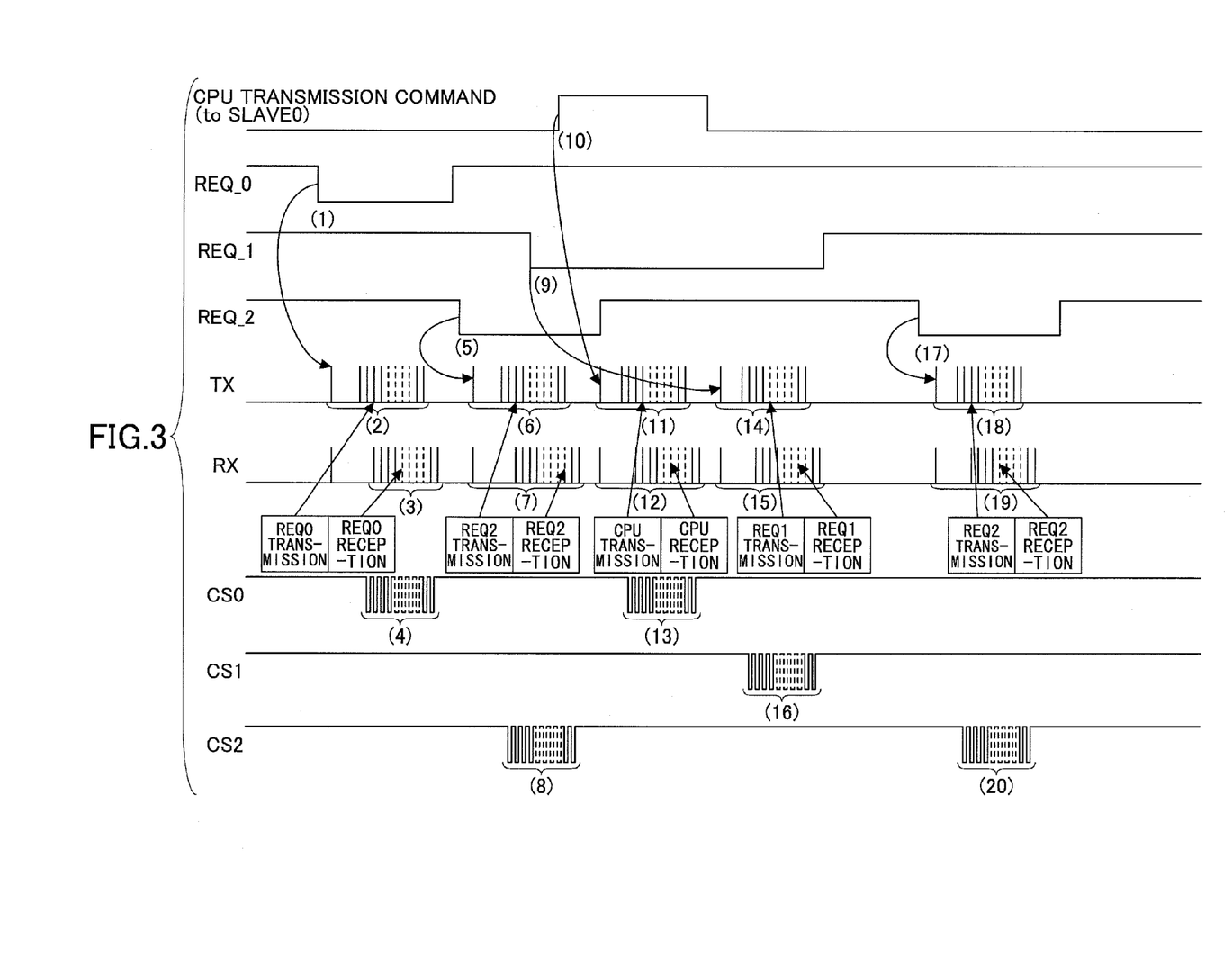
FIGS. 3 and 4 are timing charts showing one example of operations of the communication system according to the embodiment of the present invention.

FIG. 3 is one example of a timing chart of serial communication carried out by the master device 100. FIG. 3 mainly shows a relationship between receiving of the request signals and communication to be carried out in response to the receiving of the request signals.

In the example shown in FIG. 3, the request signals coming from the slave devices are processed on first-come-first-served basis. Further, the transmission requests, for transmitting from the master device 100 to the slave devices $200_0$ through $200_2$, generated by the CPU 102 have priority over a process of the master device 100 receiving data in response to the request signals coming from the slave devices $200_0$ through $200_2$. The priority order should not necessarily be limited to this, and any other priority order may be set appropriately.

In FIG. 3, the request signals from the slave devices $200_0$, $200_1$ and $200_2$ and a transmission request by the CPU 102 for transmitting data to the slave device $200_0$ are processed.

The request signal from the slave device $200_0$, the request signal from the slave device $200_2$, the request signal from the slave device $200_1$, the transmission request by the CPU 102 for transmitting to the slave device $200_0$, and the request signal from the slave device $200_2$ are generated in the stated order.

The request signals from the slave devices $200_0$, $200_1$ and $200_2$ are indicated as "REQ_0", "REQ_1" and "REQ_2", respectively. The transmission request by the CPU 102 for transmitting to the slave device $200_0$ is indicated as "CPU transmission command (to SLAVE0)".

In FIG. 3, data to transmit to the master device 100 is generated in the slave device $200_0$ (1). The slave device $200_0$ transmits the request signal to the master device (2).

The master device 100 receives the request signal from the slave device $200_0$, and the request signal is input to the communication arbitration circuit 108 (3). The selection signal indicating the slave device $200_0$ is input to the CS switching circuit 112 from the communication arbitration circuit 108. The CS switching circuit 112 transmits the chip select signal to the slave device $200_0$ according to the timing signal from the serial IF circuit 110 (4).

The slave device $200_0$ thus can transmit the data to transmit to the master device 100 in response to receiving the chip select signal from the master device 100.

Next, data to transmit to the master device 100 is generated in the slave device $200_2$ (5). The slave device $200_2$ transmits the request signal to the master device (6).

The master device 100 receives the request signal from the slave device $200_2$, and the request signal is input to the communication arbitration circuit 108 (7). The selection signal indicating the slave device $200_2$ is input to the CS switching circuit 112 from the communication arbitration circuit 108. The CS switching circuit 112 transmits the chip select signal to the slave device $200_2$ according to the timing signal from the serial IF circuit 110 (8).

The slave device $200_2$ thus can transmit the data to transmit to the master device 100 in response to receiving the chip select signal from the master device 100.

Next, data to transmit to the master device 100 is generated in the slave device $200_1$ (9). After that, data to transmit to the slave device $200_0$ is generated in the master device 100 (10).

The transmission request generated by the CPU 102 has priority over the process of the master device 100 receiving data in response to the request signals from the slave devices $200_0$ through $200_2$. Therefore, transmitting the data to the slave device $200_0$ has priority.

In the master device 100, the CPU transmission command is input to the communication arbitration circuit 108 (11, 12). From the communication arbitration circuit 108, the selection signal indicating the slave device $200_0$ is input to the CS switching circuit 112. The CS switching circuit 112 transmits the chip select signal to the slave device $200_0$ according to the timing signal from the serial IF circuit 110 (13).

The master device 100 thus can transmit the data to the slave device $200_0$ in response to the chip select signal being transmitted from the master device 100 to the slave device $200_0$.

The data to transmit to the master device 100 generated in the slave device $200_1$ is then processed.

The slave device $200_1$ transmits the request signal to the master device (14).

The master device 100 receives the request signal from the slave device $200_1$, and the request signal is input to the communication arbitration circuit 108 (15). The selection signal indicating the slave device $200_1$ is input to the CS switching circuit 112 from the communication arbitration circuit 108. The CS switching circuit 112 transmits the chip select signal to the slave device $200_1$ according to the timing signal from the serial IF circuit 110 (16).

The slave device $200_1$ thus can transmit the data to transmit to the master device 100 in response to receiving the chip select signal from the master device 100.

Next, data to transmit to the master device 100 is generated in the slave device $200_2$ (17). The slave device $200_2$ transmits the request signal to the master device (18).

The master device 100 receives the request signal from the slave device $200_2$, and the request signal is input to the communication arbitration circuit 108 (19). The selection signal indicating the slave device $200_2$ is input to the CS switching circuit 112 from the communication arbitration circuit 108. The CS switching circuit 112 transmits the chip select signal to the slave device $200_2$ according to the timing signal from the serial IF circuit 110 (20).

The slave device $200_2$ thus can transmit the data to transmit to the master device 100 in response to receiving the chip select signal from the master device 100.

In the example of FIG. 3, while the data is being transmitted in response to the request (5) from the slave device $200_2$, the request from the slave device $200_1$ (9) and the transmission request command by the CPU 102 (10) are generated in sequence. In this case, the transmission request command by the CPU 102 (10) has priority over the request from the slave device $200_1$ (9). Therefore, the transmission request by the CPU 102 is carried out subsequently after the completion of the transmitting the data to the slave device $200_2$.

<Operations of Communication System (No. 2)>

Figure 4:
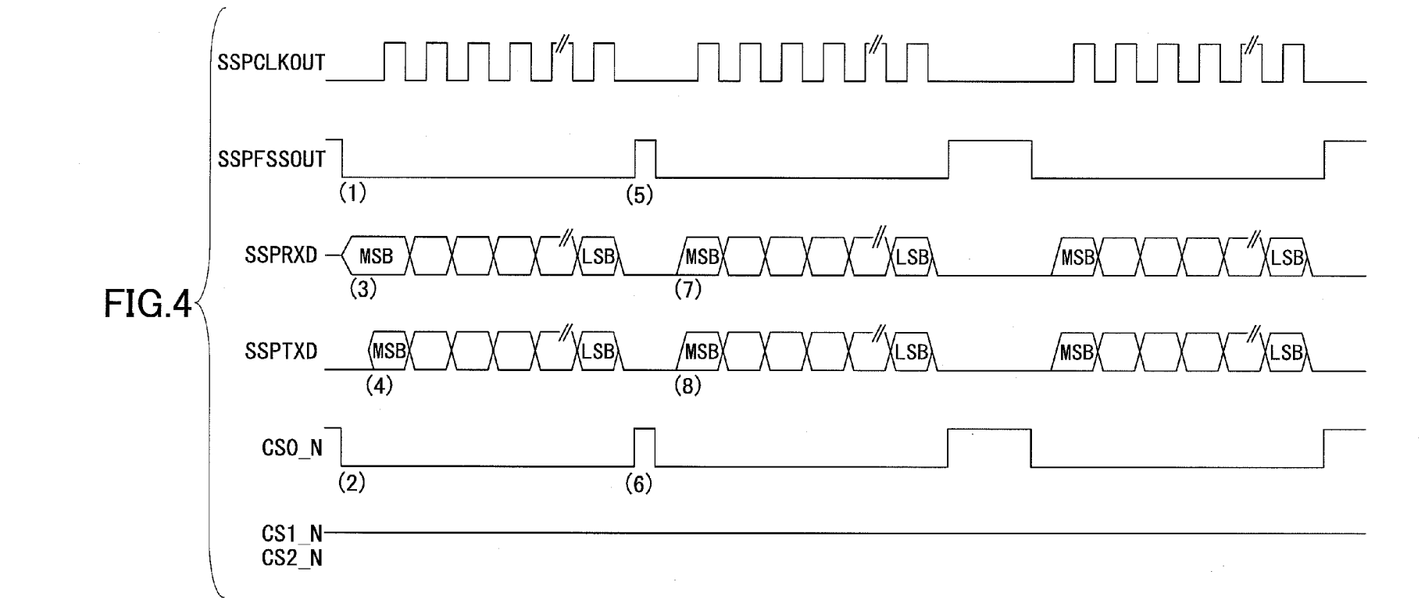

FIG. 4 shows a timing chart of the communication system. FIG. 4 mainly shows timings in serial communication carried out between the master device 100 and the slave devices $200_0$, $200_1$ and $200_2$.

In the timing chart shown in FIG. 4, the clock signal (sck) output from the serial IF circuit 110 is indicated as "SSPCLK-OUT". The timing signal output from the serial IF circuit 110 is indicated as "SSPFSSOUT". The received data (sin) input to the serial IF circuit 110 is indicated as "SSPRXD". The transmission data (sout) output from the serial IF circuit 110 is indicated as "SSPTXD". The chip select signals for the slave devices $200_0$, $200_1$ and $200_2$ are indicated as "CS0_N", "CS1_N" and "CS2_N", respectively.

In FIG. 4, according to the timing signal from the serial IF circuit 110 (1), the chip select signal is transmitted to the slave device $200_0$ from the CS switching circuit 112 (2).

The master device 100 receives the data from the slave device $200_0$ (3).

The slave device $200_0$ receives the data from the master device 100 (4). Two-way communication is thus carried out between the master device 100 and the slave device $200_0$.

At certain periods, the timing signal is input to the CS switching circuit 112 from the serial IF circuit 110 (5). According to the timing signal, the chip select signal is transmitted to the slave device $200_0$ from the chip select switching signal 112 (6). This is for the purpose that communication between the master device 100 and the slave device $200_0$ is to be continued.

The master device 100 receives the data from the slave device $200_0$ (7).

The slave device $200_0$ receives the data from the master device 100 (8).

After that, the same operations are repeated.

According to the embodiment of the present invention, by asserting the request signal when the slave device is to start communication with the master device, the slave device can carry out serial communication with the master device only when it is needed. As a result of carrying out serial communication only when it is needed, it is possible to reduce the communication amount. Further, it is possible to further reduce the load of the master device by using DMA technique when data received by serial communication is transferred to the memory.

Further, it is also possible to process one or plural requests from the slave devices and transmission requests by the CPU for one or plural of the slave devices according to the certain priority order in a case where the plural slave devices are connected to the master device or a case where data to transmit to the slave devices is generated in the master device. By processing the requests according to the certain priority order, it is possible to achieve serial communication between the plural slave devices and the master device. Also in a case where serial communication is carried out between the plural slave devices and the master device, it is possible to carry out control whereby DMA technique can be used for a transfer between the serial communication circuit and the memory. As a result, it is possible to carry out communication with the plural slave devices by the single serial communication circuit. Since the single serial communication circuit is thus sufficient even for the plural slave devices, it is possible to reduce the circuit size of the master device. Further, it is possible to reduce the load of the master device.

Thus, the communication system in the embodiment has the master device and the slave devices. The slave devices include the request signal generation parts configured to, when data to transmit is generated, generate the request signals indicating the transmission requests to the master device; and the transmission parts configured to transmit the request signals to the master device.

The master device includes the request signal reception part acting as the communication arbitration circuit and configured to receive the request signals from the slave devices; the selection part acting as the communication arbitration circuit and configured to select one of the slave devices according to the request signals received by the request signal reception part; the transmission part acting as the CS switching circuit and configured to transmit the signal indicating to allow data transmission to the slave device selected by the selection part; and the data reception part acting as the serial IF circuit and configured to receive data from the selected slave device.

In this configuration, since data transmission is started in response to a transmission request from the slave device, it is possible to reduce a communication amount in comparison to a method in which the CPU carries out polling the slave devices at predetermined periods of time.

Further, the master device has the storage part acting as the RAM and configured to store the data; and the direct memory access controller (DMAC) configured to transfer by direct memory access the data received by the data reception part to the storage part.

Since the data received from the slave device is transferred to the storage part by the DMAC, it is possible to reduce the load of the CPU of the master device.

Further, the selection part selects the slave device which is allowed to transmit data according to a certain priority order in a case where the request signals are received from plural ones of the slave devices by the request signal reception part.

Therefore, even in the serial communication system where the plural slave devices are connected to the single master device, it is possible to start transmitting data in response to the transmission requests from the slave devices. Thus, it is possible to reduce the communication amount in comparison to a method where the CPU carries out polling the slave devices at predetermined periods of time.

Further, since it is possible to use the data line and the clock line in common for the plural slave devices, and the single serial communication circuit of the master device is sufficient for the plural slave devices, it is possible to manage the plural slave device without increasing the circuit size of the master device.

Further, in a case where data to transmit is generated in the slave devices, the selection part selects one of the slave devices to be allowed to carry out communication according to the certain priority order.

Further, it is also possible to respond to a case where data to transmit to the slave device is generated in the master device. A command indicating to transmit data may be generated when the data to transmit to the slave device is generated in the master device. As a result of the command being thus generated, transmission of the data can be achieved without needing the CPU. Therefore, the load of the CPU of the master device can be reduced.

The master device is configured to carry out communication with the slave devices, and includes the request signal reception part configured to receive the request signals indicating requests to transmit data (transmission requests) from the slave devices; the selection part configured to select one of the slave devices to be allowed to transmit the data in response to the request signal received by the request signal reception part; the transmission part configured to transmit the signal indicating to allow the slave device selected by the selection part to transmit the data to the selected slave device; and the data reception part configured to receive the data from the selected slave device.

Each of the slave devices is configured to carry out communication with the master device, and includes the request signal generating part configured to generate the request signal indicating the transmission request to the master device; and the transmission part configured to transmit the request signal to the master device.

The master device selects one of the slave devices to be allowed to transmit the data in response to the request signals from the slave devices, transmits the signal indicating to allow the selected slave device to transmit the data to the selected slave device, and receives the data from the selected slave device.

The communication method in the communication system having the master device and the slave devices includes generating by the slave devices the request signals indicating the transmission requests to the master device when data to transmit is generated in the slave devices; transmitting by the slave devices the request signals to the master device; receiving by the master device the request signals from the slave devices; selecting by the master device one of the slave devices in response to the received request signals; transmitting by the master device the signal indicating to allow the selected slave device to transmit the data to the selected slave device; and receiving by the master device the data from the selected slave device.

The present invention is not limited to the specifically disclosed embodiment, and variations and modifications (including replacement of elements) may be made without departing from the scope of the present invention. For the sake of convenience of description, a functional block diagram has been used to describe the devices according to the embodiment of the present invention. However, these devices may be realized by hardware, software or a combination thereof.

The present Patent Application is based on Japanese Priority Patent Application No. 2010-208209 filed Sep. 16, 2010, the entire contents of which are hereby incorporated herein by reference.

What is claimed is:

1. A communication system comprising:
   slave devices each including
      a request signal generation part configured to, when data to transmit is generated, generate a request signal indicating a transmission request to a master device; and
      a transmission part configured to transmit the request signal to the master device; and
   the master device including
      a request signal reception part configured to receive a plurality of request signals from the slave devices;
      a selection part configured to select one of the slave devices according to the plurality of request signals received by the reception part and at least one request signal from a CPU in the master device;
      a transmission part configured to transmit a signal indicating to allow data transmission or a signal for transmitting data to the slave device selected by the selection part; and
      a data reception part configured to receive data from the selected slave device,
   wherein when the selection part of the master device receives the plurality of request signals and the at least one request signal from the CPU, the selection part selects the one of the slave devices, based on priority assigned to each of the slave devices and the at least one request signal from the CPU.

2. The communication system as claimed in claim 1, wherein the master device further includes
   a storage part configured to store the data received by the data reception part; and
   a direct memory access controller configured to transfer by direct memory access the data received by the data reception part to the storage part.

3. The communication system as claimed in claim 1, wherein
   in a case where data to transmit is generated in the slave devices, the selection part selects one of the slave devices to be allowed to carry out communication.

4. A master device configured to carry out communication with slave devices, comprising:
   a request signal reception part configured to receive a plurality of request signals indicating requests to transmit data from the slave devices;
   a selection part configured to select one of the slave devices to be allowed to transmit data or for a CPU in the master device to transmit data, in response to the plurality of request signals received by the request signal reception part and at least one request signal from the CPU;
   a transmission part configured to transmit a signal, indicating to allow the slave device selected by the selection part to transmit data, or a signal for transmitting data to the slave device selected by the selection part, to the selected slave device; and
   a data reception part configured to receive data from the selected slave device,
   wherein when the selection part of the master device receives the plurality of request signals and the at least one request signal from the CPU, the selection part selects the one of the slave devices, based on priority assigned to each of the slave devices and the at least one request signal from the CPU.

5. A slave device of slave devices configured to carry out communication with a master device, comprising:
   a request signal generating part configured to generate a request signal indicating a transmission request to the master device, in a case where data to transmit is generated; and
   a transmission part configured to transmit the request signal to the master device, wherein
   the master device selects one of the slave devices to be allowed to transmit data or to receive data from the master device, based on priority, in response to a plurality of request signals from the slave devices and at least one request signal from a CPU in the master device; transmits a signal, indicating to allow the selected slave device to transmit data, or a signal for transmitting data to the selected slave device, to the selected slave device; and receives data from the selected slave device or transmit data to the selected slave device.

6. A communication method in a communication system having a master device and slave devices, the method comprising:
   generating by the slave devices a plurality of request signals indicating transmission requests to the master device when data to transmit is generated;
   transmitting by the slave devices the plurality of request signals to the master device;
   receiving by the master device the plurality of request signals from the slave devices;

selecting by the master device one of the slave devices in response to the plurality of received request signals and at least one request from a CPU in the master device;

transmitting by the master device a signal, indicating to allow the selected slave device to transmit data, or a signal for transmitting data to the selected slave device, to the selected slave device; and receiving by the master device data from the selected slave device or transmitting data to the selected slave device, wherein when the master device receives the plurality of request signals and the at least one request signal from the CPU, the master device selects the one of the slave devices, based on priority assigned to each of the slave devices and the at least one request signal from the CPU.

* * * * *